March 16, 1965  F. ZIMMER ETAL  3,173,522

JOINTS

Filed Nov. 15, 1961  2 Sheets-Sheet 1

Inventors
FRANTISEK ZIMMER
PETER ROBERT MARSHALL
By Norris & Bateman
Attorneys

Inventors
FRANTISEK ZIMMER
PETER ROBERT MARSHALL
By Norris & Bateman
Attorneys

United States Patent Office 3,173,522
Patented Mar. 16, 1965

3,173,522
JOINTS
Frantisek Zimmer, 49a Ave. Winston Churchill, Brussels, Belgium, and Peter Robert Marshall, 48 Malcolm Road, Shirley, England
Filed Nov. 15, 1961, Ser. No. 152,575
8 Claims. (Cl. 189—36)

This invention relates to joints of the kind which are subject to such changes in temperature that there is difficulty in maintaining an effective joint, particularly against fluids under pressure, by the usual mechanical means such, for example, as bolts or other clamping means, in association wth packing washers or the like.

In the case of a simple joint comprising two flanged members (forming part of a fluid-containing structure subject to severe changes in temperature) which are secured together by the tightening of nuts or bolts which pass through the flanges, the flanged members are usually heated or cooled more rapidly than the bolts. Measurements have shown that the maximum difference in temperature between the flanged members and the bolts can range from about 10° C. to about 100° C. depending inter alia upon the severity of the heating or cooling. This difference in the temperature produces a differential expansion or contraction between the bolts and the flanged members which can adversely affect the tightness of the joint. In some constructions which we have studied a difference of 10° C. produced a differential tension in the bolts of 2.3 kg. per sq. mm., i.e., 23 kg. per sq. mm. for a difference of 100° C.

The differential tension can, in the case of rapid heating, increase the tension of the bolts to such an extent that the elastic limit is exceeded; thus a permanent plastic elongation of the bolts is produced with the resultant probability of the joint not being leak proof.

In the case of rapid cooling the bolts usually remain for a time hotter than the flanged members and under such circumstances their tension can temporarily fall below the value necessary to ensure sufficient tightness to prevent leaks.

It may also be mentioned that leaks, even temporary, between joints working at high pressures and high temperatures abrade by erosion and may entail expensive repairs.

With a view to eliminating the undesirable differences between the temperatures of the bolts and the flanged elements complicated and costly arrangements are often used. Such a case, for example, is an arrangement used in the construction of steam turbines. It comprises causing the steam to circulate over the bolts and between the two flanges of the flanged elements.

The principal object of this invention is to provide means in joints for reducing the tendency to leak arising from temperature changes.

According to the invention means for securing a tightenable joint between two members of a structure subject to a temperature differential on sudden heating or cooling, comprises the interposition between the jointed members of a thermally conductive element manufactured by powder metallurgy methods and so constructed that it is capable of being compressed as the joint is tightened, thereby providing thermal contact between the members.

The element is preferably formed from material having a high thermal conductivity. One suitable material is copper, and the necessary compressibility can be provided by making the element porous by known powder metallurgy methods. A preferred porosity is in the region of 23 to 35%, the element then having the character of a metallic sponge.

In one form of the invention for use in joints in which members are secured together by one or more bolts passed through holes in the members, the holes in the members are of diameter greater than at least a part of the or each bolt, and this part of the bolt is surrounded by annular thermally conductive elements which on tightening the bolt will be compressed axially and so caused to expand radially so as to make intimate contact with the bolt and the walls of the holes. If the shank of the bolt is of diameter smaller than the peak diameter of its screw threads, the annular elements are formed in halves for fitting around the shank, and can be secured in position for example by wire or circlips or by adhesive on their end faces.

In order that the features of the invention may be clearly understood reference will now be made to the accompanying drawings, in which.

Figure 1:
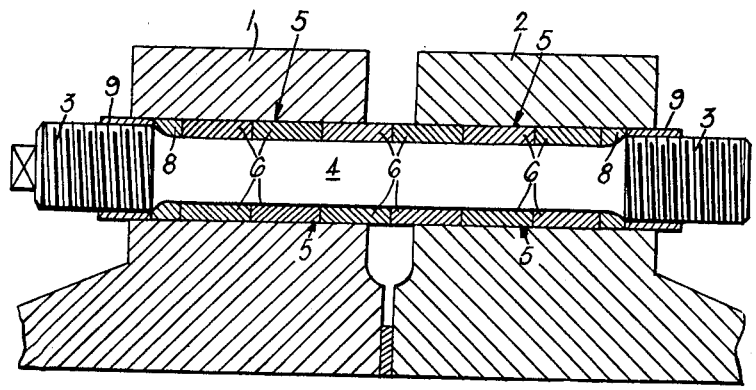
FIGURES 1 and 2 are fragmentary sectional views of a joint constructed in accordance with the features of the invention.
Figure 2:
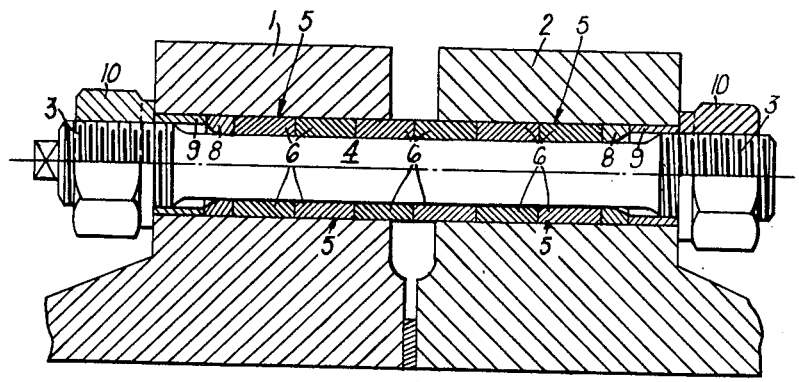
Figure 3:
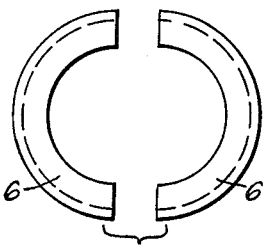
FIGURE 3 is an end elevation of one of the annular powered metal bushes of FIGURES 1 and 2.
Figure 3A:
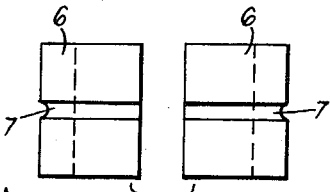
FIGURE 3A is a side elevation of the bush of FIGURE 3.
Figure 4:
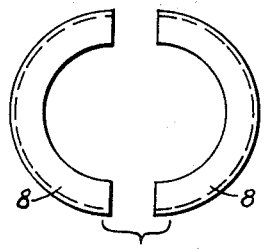
FIGURE 4 is an end elevation of one of the steel bushes of FIGURES 1 and 2.
Figure 4A:
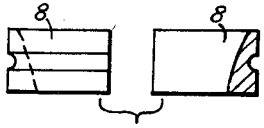
FIGURE 4A is a side elevation of bush of FIGURE 4.

As shown in FIGURES 1 and 2, the two flanged members 1 and 2 of a joint are bolted together by bolts 3 each having a shank 4 of diameter smaller than the peak diameter of the threaded ends, the holes 5 in the flanges being of diameter somewhat greater than the screw threaded ends. A number of annular bushes 6, preferably fabricated of porous copper, formed in halves by powder metallurgy, as shown in FIGURE 3, are mounted side-by-side on the stem or shank 4 of each bolt and secured in position either by circlips fitted in circumferential grooves 7 formed in the outer surfaces of the bush halves, or in the arrangement shown in FIGURES 1 and 2 by contact adhesive on their end faces which secures the two halves of each bush together as soon as they are brought into contact. Similar steel bushes 8 also formed in halves, as shown in FIGURE 4, are mounted on the shank 4 at each end of the pack of copper bushes 6, and the bores of these steel bushes are shaped to fit that portion of the shank which increases in diameter towards the threaded ends of the bolt 3. A steel sleeve 9 is fitted over the screw threaded ends of the bolt 3 so as to engage the steel bush 8 and a nut 10 by which the bolt is tightened. The external diameter of the copper and steel bushes 6 and 8 and the sleeves 9 is such as to slide easily through the holes 5 in the flanges 1 and 2. The bolt, with the bushes and sleeve assembled, as shown in FIGURE 1, is passed through the holes 5 in the flanges. With the nuts 10 fitted and tightened, as shown in FIGURE 2, the sleeve 9 transmit axial pressure to the bushes 6 and 8 as the nuts are tightened, compressing the copper bushes 6 and causing them initially to expand radially so as to make intimate contact with the bolt shank 4 and the walls of the holes 5. After such radial expansion the bushes 6 are compressed axially in bulk to enable the flanges 1 and 2 to be tightened together in sealing relation.

When the joint is tightened, the copper bushes, being in intimate contact with the flanges and the bolt, transmit rapidly to the bolts all temperature changes in the flanges, so that differential expansion of the flanges and bolts is substantially reduced, and the above-mentioned difficulties produced by such differential expansion are avoided.

In order to assist the sliding of the bushes on the bolt and in the holes as they are axially compressed, the bolt and the holes are preferably lubricated on assembly by dipping or painting with lubricant, for example colloidal graphite or molybdenum disulphide. The bushes themselves may alternatively be dipped or painted with lubricant, or may be impregnated with lubricant during manufacture.

In a test on the cover plate of a heat exchanger, the cover was secured with bolts fitted with bushes according to the invention and with normal bolts. One of each of these bolts was drilled with a narrow axial hole in which a thermocouple was fitted, and a similar hole was drilled in the plate, midway between the two test bolts, for a third thermocouple. The bolts were of diameter 38.1 mm. and of stem diameter 31 mm. and length 185 mm. Eight porous copper bushes, formed in halves, of inner diameter 28 mm. outer diameter 41 mm. and porosity 29.5% (i.e., 29.5% by volume of air in the material) were fitted over the bolts according to the invention. On tightening the bolts the pack of bushes was reduced in length by 18.5 mm. (i.e., one tenth of its length).

The temperature of the assembly was allowed to come to equilibrium at 310° C. by admitting superheated steam, and cold water was then admitted to cool to a temperature of 240° C. The temperatures recorded by the thermocouples were noted during this cooling, when it was found that the temperature of the bolt fitted with bushes according to the invention followed closely the temperature of the cover whereas the temperature of the normal bolt differed from that of the cover throughout the cooling by up to 19° C.

By virtue of the invention not only are leakage and the risk of fracture or stretching of bolts due to excessive forces avoided, but also as a result of this the frequent retightening of the bolts and the risk of over-straining them are substantially reduced and thus the time in which plant is likely to be out of commission for maintenance is reduced. Furthermore, since the forces on the bolts and the flanges are reduced, somewhat smaller bolts and flanges may in some circumstances be used, leading to reduced costs.

We claim:

1. In a joint between two members of a structure subject to sudden temperature changes and comprising flanges on said members secured together by bolts passing through aligned bores in the flanges, annular bushing means of compressible high thermal conductivity metal surrounding each of said bolts within said bores, and means for tightening said bolts to urge said flanges tightly together, said tightening means axially compressing and radially expanding said bushing means into intimate heat exchange contact with its associated bore and bolt.

2. In the joint defined in claim 1, said bushing means consisting of at least one porous metal annulus or compressed sintered powdered metal.

3. In the joint defined in claim 2, said powdered metal being copper.

4. In the joint defined in claim 2, said tightening means comprising a nut threaded upon an end of the bolt and a steel force transmitting annulus axially interposed between the nut and the adjacent end of said bushing means within the adjacent bore.

5. In a joint between two members of a structure subject to sudden temperature changes and comprising flanges on said members secured together by bolts passing through aligned bores in the flanges, bushing means comprising a plurality of annular bushings disposed side by side along each bolt within the associated bores, each of said bushings being of compressible metal having high thermal conductivity, and means reacting between opposite ends of the bolts for tensioning the bolts to draw said flanges tightly together, said tightening means being effective to axially compress said bushing means whereby said annular bushings are compressed axially in abutting relation and expanded radially into intimate heat exchange contact with the associated bore and bolt.

6. In the joint defined in claim 5, said annular bushings each consisting diametrally split halves of porous powdered sintered metal.

7. In the joint defined in claim 5, each bolt having enlarged end member thereon outside the flanges, one of said enlarged end members being a nut threaded on the bolt, and there being force transmitting means between said nut and the adjacent end of said bushing means within the bore comprising axially rigid annular means.

8. In the joint defined in claim 7, said bolt having a reduced diameter shank on which said bushing means is mounted, and said axially rigid means comprising a rigid metal bushing within the bore abutting the end of the bushing means, and a rigid metal sleeve surrounding the threaded end of the bolt axially interposed between said nut and said rigid bushing.

References Cited in the file of this patent

UNITED STATES PATENTS

| | | |
|---|---|---|
| 1,257,943 | Howard | Feb. 26, 1918 |
| 1,937,465 | Sherwood | Nov. 28, 1933 |
| 2,000,653 | Wilkinson | May 7, 1935 |
| 2,196,683 | Pickstone | Apr. 9, 1940 |
| 2,808,616 | Baldasarre et al. | Oct. 8, 1957 |
| 3,045,785 | Ferguson | July 24, 1962 |
| 3,052,452 | Taga | Sept. 4, 1962 |